United States Patent [19]

Rautiola

[11] Patent Number: 5,752,197
[45] Date of Patent: May 12, 1998

[54] METHOD FOR ADJUSTING TRANSMISSION POWER IN A RADIO SYSTEM, AND AN EXCHANGE

[75] Inventor: Markku Rautiola, Tampere, Finland

[73] Assignee: Nokia Telecommunications Oy, Espoo, Finland

[21] Appl. No.: 600,990

[22] PCT Filed: Sep. 2, 1994

[86] PCT No.: PCT/FI94/00390

§ 371 Date: Jun. 6, 1996

§ 102(e) Date: Jun. 6, 1996

[87] PCT Pub. No.: WO95/07012

PCT Pub. Date: Mar. 9, 1995

[30] Foreign Application Priority Data

Sep. 3, 1993 [FI] Finland .................. 933865

[51] Int. Cl.$^6$ .................. H04B 1/00; H04B 7/00
[52] U.S. Cl. .................. 455/522; 455/517; 455/522; 455/524; 455/525
[58] Field of Search .................. 455/33.1, 34.1, 455/34.2, 54.1, 54.2, 56.1, 62, 63, 69, 422, 450, 451, 452, 517, 510, 524, 525, 522

[56] References Cited

U.S. PATENT DOCUMENTS

| | | |
|---|---|---|
| 5,157,709 | 10/1992 | Ohteru . |
| 5,241,690 | 8/1993 | Larsson et al. .................. 455/54.1 |
| 5,345,598 | 9/1994 | Dent .................. 455/54.1 |
| 5,386,589 | 1/1995 | Kanai .................. 455/33.1 |
| 5,507,008 | 4/1996 | Kanai et al. .................. 455/34.1 |
| 5,551,057 | 8/1996 | Mitra .................. 455/56.1 |
| 5,566,356 | 10/1996 | Taketsugu .................. 455/56.1 |

FOREIGN PATENT DOCUMENTS

| | | |
|---|---|---|
| 0 411 878 | 2/1991 | European Pat. Off. . |
| 0 462 601 | 12/1991 | European Pat. Off. . |
| 0 462 952 | 12/1991 | European Pat. Off. . |
| 2 234 142 | 1/1994 | United Kingdom . |
| 92/11736 | 7/1992 | WIPO . |

Primary Examiner—Reinhard J. Eisenzopf
Assistant Examiner—Gertrude Arthur
Attorney, Agent, or Firm—IP Group of Pillsbury Madison and Sutro LLP

[57] ABSTRACT

A method for adjusting transmission power in a mobile radio system having radio cells each having a base station, an exchange of the system having a database listing base stations subject to interference as a result of the use of a specific channel. To minimize the number of base stations subject to interference, the exchange steplessly selects the lowest possible power level for use in radio traffic between the subscriber station and a respective base station on the basis of the quality of transmission from the respective subscriber station, and commands a base station respective and the respective subscriber station to use the respective selected power level on a specific traffic channel. The exchange changes the number of base stations in the database of base stations subject to interference, depending on the power level selected for the traffic channel. The respective base station and the respective subscriber station start to use the respective power level on a specific traffic channel.

3 Claims, 1 Drawing Sheet

METHOD FOR ADJUSTING TRANSMISSION POWER IN A RADIO SYSTEM, AND AN EXCHANGE

This application claims benefit of international application PCT/FI94/00390, filed Sep. 2, 1994.

FIELD OF THE INVENTION

The invention relates to a method for adjusting transmission power in a mobile radio system covering a geographical area divided into radio cells each comprising a base station, an exchange of the system comprising a database listing base stations subject to interference as a result of the use of a specific channel, wherein a subscriber station transmits a connection establishment request; a base station receives the connection establishment request transmitted by the subscriber station; the base station measures the quality of the transmission from the subscriber station and transmits information about the quality of the transmission to the exchange.

The invention further relates to a mobile exchange comprising: a switching field for switching calls; an interface unit; a controller for controlling the switching field; a memory means including a database listing base stations subject to interference as a result of the use of a specific channel.

The invention can be applied e.g. in trunking networks, i.e. shared radio networks, which are private mobile radio networks sharing radio channels to offer several user groups similar functions and services as a private mobile radio network used by a single organization.

However, the invention is equally applicable in conventional cellular radio telephone systems, e.g. mobile radio systems such as the GSM system.

The invention is suitable for use in radio telephone systems having either an analog or a digital radio path. Analog radio telephone systems are described e.g. in MPT 1327, *A Signalling Standard for Trunked Private Land Mobile Radio Systems*, Radiocommunications Agency, January 1988, Revised and reprinted November 1991, and MPT 1343, *Performance Specification*, Radiocommunications Agency, January 1988, Revised and reprinted September 1991, both issued by the British Department of Trade and Industry.

BACKGROUND OF THE INVENTION

In radio telephone systems, it has been known that the base stations of the radio telephone system measure the quality of radio paths between the base stations and subscriber stations, such as radio telephones, hand portable phones or mobile phones, in the radio telephone system. This has been done by measuring the quality of radio messages transmitted by subscriber stations, such as signalling or connection establishment requests; the quality is represented by the power level or signal strength of the received transmission. Base stations performing such measurements may have been main base stations or additional base stations called infill base stations in the radio cells. In prior art solutions, the measuring data obtained by the base stations has been transmitted to the exchange of the radio telephone system, and the exchange has stored the data in its database. Later on, the exchange has retrieved from the database the newest measuring data item or a measuring data item in which the value describing the quality of the radio path indicates that this particular radio path is the best available radio path. The exchange has used this measuring data to select the base station having the best received signal quality for communication between the subscriber station and the mobile exchange. The exchange has then informed the subscriber station over the signalling or control channel of the system which is the base station the exchange wants the subscriber station to communicate with. It has also been known that if the base station with which the subscriber station is expected to start to communicate has been an additional or infill base station, it has been possible for the exchange to command the subscriber station and the concerned base station to use only half of the radio power on the traffic channel between them.

Furthermore, the prior art radio telephone systems, typically their exchanges, have included a database with a table containing information for each base station about base stations and channels subject to interference corresponding each channel. In other words, this is a list of base stations and channels which have been interfered with when a specific radio channel has been used within the service area of a specific base station. When the exchange has allocated a specific channel for radio traffic between a specific base station and subscriber station, it has cancelled the right of adjacent base stations to use this particular channel, i.e. of base stations which would have been subject to interference if they had used this channel. Interfereability means that radio traffic between a base station and a subscriber station to which that channel would have been allocated would have caused crosstalk and disturbed other base stations and subscriber stations using the same channel.

A problem with the prior art solutions has been that when a specific channel has been used in the traffic between a specific base station and subscriber station on a specific constant power level, typically at full power or half power, plenty of radio-frequency capacity has been wasted, as the radio traffic between the base station and the subscriber station has taken place at an unnecessary high power level, as a result of which very many base stations (i.e. their channels) have been subject to interference. On the other hand, if additional or infill base stations have been used at half power, there is still a great number of other base stations that are interfered with; above all, a separate concept of an additional or infill base station has been necessary. The concept of additional base station and the management of such additional base stations have, of course, complicated the structure and management of the radio telephone system.

Another problem with the use of additional base stations has been that, in the prior art solution, when the exchange of the radio telephone system has informed the additional base station that the additional base station should start to listen to traffic on a specific control channel, the additional base station really starts to listen to this control channel, and searches for subscriber-station signalling on that channel. As is apparent to the reader, in the prior art solution, the additional base station itself does not transmit signalling on the control channel to the main base station. As a consequence, if the additional base station listens to the control channel of a specific main base station and this main base station suddenly ceases to operate, e.g. if its transceiver fails, all subscriber stations i.e. mobile radios within the coverage area of this particular main base station start to listen to the control channels of other main base stations adjacent to this particular base station after the search process of the control channel. Additional base stations located within the coverage area of the main base station thus remain to listen to the "empty" control channel, on which the subscriber stations communicate no longer. In such a case, the additional base station is of no use.

SUMMARY OF THE INVENTION

The object of the present invention is to avoid the problems described above and to provide a method and a mobile exchange which allow the transmission power of base stations and subscriber stations in a radio telephone system to be adjusted in such a way that the number of base stations subject to interference will be minimized and to define the number of base stations subject to interference thus formed as flexibly as possible so that a base station will not unnecessarily be defined as one subject to interference.

This new method for adjusting transmission power is achieved by a method according to the invention, which is characterized in that the exchange steplessly selects the lowest possible power level for use in radio traffic between the subscriber station and the base station on the basis of the quality of the transmission, and commands the base station and the subscriber station to use the selected power level on a specific traffic channel; the exchange changes the list of base stations in the database of base stations subject to interference and the number of such base stations, depending on the power level selected for said traffic channel; the base station and the subscriber station start to use the respective power level on a specific traffic channel.

The invention also relates to a mobile exchange which is characterized in that the controller comprises: means for steplessly selecting the lowest possible power level for use in radio traffic between a subscriber station and a base station on the basis of the quality of transmission from the subscriber station and/or the base station, and for commanding the base station and the subscriber station to use the respective selected power level on a specific traffic channel; and means for changing the list of base stations in the database of base stations subject to interference and the number of such base stations, depending on the power level selected for the traffic channel.

The invention is based on the idea that traffic channel units subject to interference in other base stations are defined for the interfering traffic channel units of a particular base station i.e. the units transmitting/receiving traffic channels, on the basis of the power level used in traffic between that particular base station and the subscriber station. The number and location of base stations subject to interference and their traffic channel units are defined as a function of the transmission power of interfering transmitters, in addition to which the interfering transmission power is maintained on the lowest possible level in accordance with the invention. Accordingly, when the exchange allocates a traffic channel for use between the subscriber station and the base station, the base stations or traffic channel units defined as subject to interference at that particular transmission power are restrained from using the allocated channel. According to the invention, the applied transmission power can be changed and it is thereby also possible to vary the number of base stations or traffic-channel units subject to interference.

An advantage of the method according to the invention for adjusting transmission power and the mobile exchange is that the size of the coverage area of a radio channel used in communication between each base station and a subscriber station is reduced to such an extent that communication between the subscriber station and the base station will still be completed successfully, but the coverage area will not cause a great number of base stations subject to interference to occur, but the number of such base stations will still be minimized. This saves radiofrequency capacity. Furthermore, a mobile radio network operating according to the invention allows more traffic than the prior art network. This is due to the fact that, as compared with the prior art, the same channels can be re-used at a shorter distance than previously.

Another advantage of the invention is that the use of traffic channels from a point of reference at adjacent base stations is optimized or even maximized, which reduces the load imposed on the network and the frequency range.

BRIEF DESCRIPTION OF THE DRAWINGS

In the following, the invention will be described more fully with reference to the attached drawings, in which.

DETAILED DESCRIPTION OF A PREFERRED EMBODIMENT OF THE INVENTION

Figure 1:
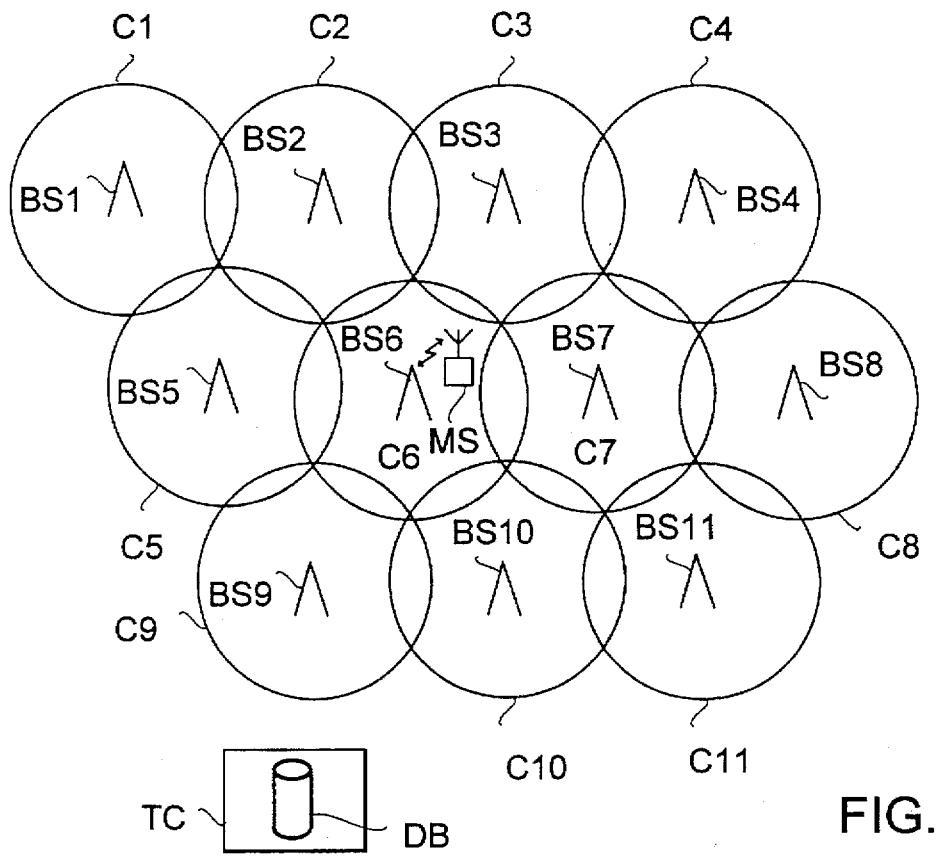
FIG. 1 is a schematic view of a radio telephone system according to the invention with its base stations.

FIG. 1 shows a radio telephone system comprising base stations BS1 to BS11 having coverage areas C1 to C11. The figure also shows a mobile exchange TC including a database listing base stations that will be interfered with as a result of the use of a specific channel on a specific power level. The base stations BS1 to BS11 of course communicate with the exchange TC, even though such telecommunications connections are not shown in the figure for the sake of clarity. A subscriber station MS, which is a radio telephone, mobile radio or hand portable phone, is connected to the radio telephone system through the base station BS6. The subscriber station is connected to the radio telephone network or cellular radio system through a base station, here through the base station BS6. When the subscriber station MS enters the mobile radio network or wishes to establish a connection, it transmits a connection establishment request to the base station BS6, which receives the request. At the same time the base station BS6 measures the quality of the transmission from the subscriber station by applying a suitable criterion. Suitable criteria include the power of the received transmission or the number of errors detected in the received transmission. There are also other suitable criteria. After having measured the quality of the received transmission, the base station informs the mobile exchange TC of the quality. On the basis of the quality of the received transmission, the exchange selects the lowest possible power for use in communication between the subscriber station MS and the base station BS6 on a specific channel. In the system according to the invention, this power can be selected steplessly. After having selected an appropriate power level, the exchange commands the base station BS6 through its telecommunication connections to use this power level in communication with the particular subscriber station MS. The same indication of the power level applied is forwarded to the subscriber station MS. The power level is then used on a specific channel, which may be either logical or physical. It is to be noted that the transmission power used by the base station may nevertheless differ from the transmission power used by the subscriber station. The channel may be a time slot at a certain frequency, or a certain frequency. The mobile exchange TC according to the invention also comprises a database DB which lists, separately for each base station, base stations that will be interfered with as a result of the use of a specific channel at a specific power, so that it is not advisable to use that channel in these base stations. The idea of the invention is that, first, the power level used on a specific channel over the radio path between the subscriber station MS and the base station BS6 is changed so that it is just enough to guarantee an adequate quality of transmission in the traffic between the subscriber station and the base station. Second, the idea of the invention is that the number of base stations subject to interference listed in the database DB can be changed, depending on the transmission power used between the base station BS6 and the subscriber station MS. Accordingly, in this example, if the maximum transmission power is used between the base station BS6 and the subscriber station MS, the list of base stations subject to interference includes the base stations BS1 to BS11.

On the other hand, if a slightly lower power level is used, the list or database of base stations subject to interference includes, e.g., the base stations BS2, BS3, BS5, BS6, BS7, BS9 and BS10. Further, if the lowest possible power level is used in the traffic between the base station BS6 and the subscriber station MS, the base stations subject to interference possibly include only the base station BS6. This base station may be included in the list of base stations subject to interference, or it may not be included, as it can be regarded as obvious that there will be no attempts to use this base station in a specific time slot or at a specific frequency in communication with two subscriber stations at the same time. It is to be noted that both the power used over the radio connection and the number of base stations subject to interference may be selected steplessly. The invention may also be implemented in such a way that the database DB comprises several different groups of identities of base stations subject to interference for each channel and base station so that a specific group of base stations subject to interference corresponds to a specific transmission power in the traffic between the base station and the subscriber station. When the exchange selects a specific power level for communication between the base station and the subscriber station, it retrieves from its database the list of base stations subject to interference that correspond to this power level and prevents these base stations from using the same channel while signalling with the subscriber station. This operation can be kept such that there is a specific database of base stations subject to interference provided for a specific radio connection between the subscriber station and the base station. The base station list of this database and the number of the base stations can be changed, depending on the transmission power used in the radio traffic between the base station and the subscriber station.

It is to be noted that one feature of the invention is that the quality of the radio connection between the subscriber station MS and the base station can be monitored not only when the subscriber station is establishing a connection with the base station but also at other times. The quality of the radio connection can be monitored whenever after the establishment of the radio connection. The base station starts independently to measure the transmission of the subscriber station on the channel used, typically a traffic channel, and transmits the measuring result to the mobile exchange. The exchange thereby selects the lowest possible power level for use on the traffic channel, and informs the base station and the subscriber station of the power level they are expected to use. At the same time the exchange changes the number of base stations included in the list of base stations subject to interference in the database on the basis of the power level used on the traffic channel.

Figure 2:
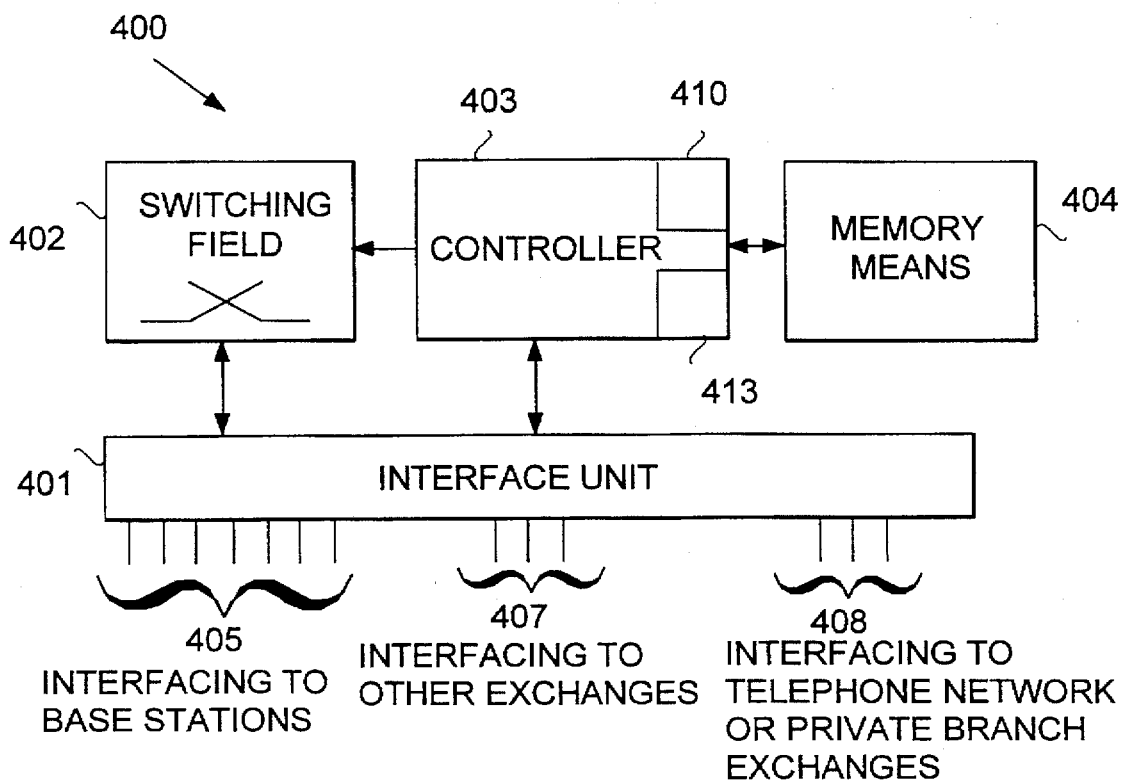
FIG. 2 is a block diagram of a mobile exchange according the invention.

FIG. 2 shows a block diagram illustrating a mobile exchange 400 according to the invention. FIG. 2 shows the structure of the mobile exchange TC; 400. The exchange 400 comprises an interface unit 401; a switching field 402; and a controller 403 having an associated memory means 404, to which a database (indicated by the reference DB also in FIG. 1) is stored. For each base station, the database contains channel-associated information about base stations subject to interference as a function of the power level used on the channel.

The function of the interface unit 401 is to interface to the base stations BS1 to BS11, to other exchanges 407 of the same network, and to a telephone network 408 or private branch exchanges. The interface unit 401 passes speech from different interfaces to the switching field 402 (and vice versa) and to the signalling controller 403, which, e.g., sets up and releases calls or switches transmission periods on the basis of that speech.

The controller 403 of the mobile exchange 400 according to the invention comprises means 410 for steplessly selecting the smallest possible power for use in the radio traffic between the subscriber station and the base station on the basis of the quality of the transmission from the subscriber station and/or the base station. This selection is made, e.g. by comparing a measuring result obtained from the base station on the quality of the radio connection to a desired measuring result value, and increasing the transmission power if the result of the comparison indicates that this is needed. The controller 403 further comprises means for commanding the base station and the subscriber station to use this selected power on a specific traffic channel. The controller further comprises means 413 for changing the number of base stations listed in the database of base stations subject to interference, depending on the power level selected for use on the traffic channel. Modification of the list of base stations subject to interference has been described more closely with reference to FIG. 1.

The drawings and the description related to them are only intended to illustrate the idea of the invention. In its details, the transmission power adjusting method in the radio telephone system and the mobile exchange may vary within the scope of the claims. Even though the invention has been described above mainly with reference to trunking radio systems, it may also be used in other type of radio telephone and mobile radio systems, such as the GSM system.

I claim:

1. A method for adjusting transmission power in a mobile radio system covering a geographical area which is divided into a plurality of radio cells each comprising a base station, an exchange of the system comprising a database, said method comprising:

listing in a list in said database base stations of said mobile radio system which are subject to interference as a result of the use of a respective specific channel;

a subscriber station of said mobile radio system transmitting a connection establishment request;

a base station of said mobile radio system receiving the connection establishment request transmitted by the subscriber station;

said base station measuring the quality of the transmission from said subscriber station;

said base station sending base station information about the quality of the transmission to said exchange;

said exchange selecting a lowest possible power level for use in radio traffic a specific traffic channel between said subscriber station and said base station on the basis of the quality of said transmission from said subscriber station;

said exchange commanding said base station and said subscriber station to use said selected power level on said specific traffic channel;

said exchange changing as to presence or absence on said list, list of base stations in the database of base stations which are subject to interference, depending on the power level selected for said specific traffic channel;

said exchange changing in said database of base stations the number of said base stations subject to interference, depending on the power level selected for said specific traffic channel; and said base station and said subscriber station starting to use said selected power level on said specific traffic channel.

2. A power adjusting method according to claim 1, further comprising the steps of:

said base station starting independently of said transmitting of a connection establishment request to measure the quality of a transmission from said subscriber station on said specific traffic channel;

said base station informing said exchange of said quality as obtained from said starting independently to increase;

in response to said informing, said exchange selecting a lowest possible power level for use and commanding said base station and said subscriber station to use said selected power level on said traffic channel; and said exchange changing said list and said number of base stations subject to interference in said database, depending on said selected power level used on said specific traffic channel.

3. A mobile exchange, comprising:

a switching equipment for switching calls;

an interface unit;

a controller for controlling said switching equipment;

a memory means including a database which lists on a list base stations that are subject to interference as a result of use by such base stations of a specific traffic channel;

means for selecting a lowest possible power level for use in radio traffic between a respective subscriber station and a respective base station on the basis of the quality of transmission from at least one of said subscriber station and said base station, and for commanding said base station and said subscriber station to use said selected power level on a respective said specific traffic channel; and means for changing said list of base stations in said database of base stations subject to interference and the number of such base stations, depending on the power level selected for each said specific traffic channel.

* * * * *